United States Patent [19]

Wood et al.

[11] Patent Number: 4,822,219

[45] Date of Patent: Apr. 18, 1989

[54] HOLDDOWN AND CHIP REMOVAL MEANS FOR A CUTTING MACHINE

[75] Inventors: Kenneth O. Wood, Ellington; Wolfgang M. Strobel, Southington, both of Conn.

[73] Assignee: Gerber Scientific Products, Inc., Manchester, Conn.

[21] Appl. No.: 201,069

[22] Filed: May 31, 1988

[51] Int. Cl.$^4$ .......................................... B23Q 11/02
[52] U.S. Cl. ..................................... 409/137; 51/273; 83/100; 144/252 R; 408/67; 408/95
[58] Field of Search ............................ 408/67, 95, 98; 409/137; 83/100; 51/273; 144/252 R, 252 A; 29/78, DIG. 84, DIG. 94

[56] References Cited

U.S. PATENT DOCUMENTS

| | | | |
|---|---|---|---|
| 3,837,383 | 9/1974 | Ko | 408/67 X |
| 3,942,411 | 3/1976 | Gerber | 409/137 |
| 4,037,982 | 7/1977 | Clement | 408/67 X |
| 4,340,326 | 7/1982 | Buonauro et al. | 408/67 X |
| 4,738,571 | 4/1988 | Olson et al. | 408/67 X |

Primary Examiner—Gil Weidenfeld
Assistant Examiner—Steven C. Bishop
Attorney, Agent, or Firm—McCormick, Paulding & Huber

[57] ABSTRACT

A cutting machine has a planar support surface for supporting a work piece and a carriage supported for movement above the planar surface. The carriage independently supports a vacuum shroud having a body portion partially defining a chamber and at least one duct portion outwardly extending therefrom. The body portion is adjustably fixed to the carriage through a connecting flange which extends upwardly from the body portion. The body portion also has a base portion that supports a resilient layer and a contact elements, the layer when it is compressed, exerts a force between the base portion and the contact element contacting the work piece supported on the planar support surface.

19 Claims, 2 Drawing Sheets

HOLDDOWN AND CHIP REMOVAL MEANS FOR A CUTTING MACHINE

BACKGROUND OF THE INVENTION

The present invention relates to a work material holddown and chip removal means for a cutting machine, and more particularly is concerned with a vacuum shroud assembly which removes shreds or chips of cut sheet material and independently holds down the remaining uncut material as a pattern is being cut by the cutting machine.

It is generally known to use an automatically controlled cutting machine to cut a path or a pattern piece from sheet material such as cardboard, plastic, thin metal, acrylic or carbonate. These automatically controlled cutting machines utilize a rotating cutting implement having a plurality of helical cutting edges arranged about an axis of rotation which selectively engage and cut the sheet material when lowered into the material by an actuator and when moved laterally through the material in response to commands generated by a controller. However, in rotating the cutting implement into the sheet material, the helical cutting edges tend to pull the material upwardly thus causing unwanted bending or creasing in the localized area. It is known to utilize a presser foot or holddown to prevent the unwanted deformation of the sheet material along the cutting path. Also known is the use of a presser foot having a vacuum chamber which removes shreds or chips of cut material from the area adjacent the cut path during the cutting operation while simultaneously holding down the remaining uncut sheet material onto the support surface.

However, the presser foot assemblies having vacuum chambers usually are fixed to the cutting implement support structure such that the presser foot is moved vertically with the movements of the cutting implement. Accordingly, contact between the presser foot bottom surface and the upper surface of the sheet material largely depend upon the vertical movement of the cutting implement support structure and the accuracy of the actuator creating the vertical movements. Play or other undesirable variances may develop in these components over a period of time. Subsequently, the play could effect the downward force necessary to create an effective seal between the presser foot bottom surface and the sheet material thus reducing the capacity of the vacuum chamber to evacuate the cut shreds or chips.

Another problem experienced with these assemblies is the impossibility of continually maintaining the same seal between the presser foot bottom surface and the sheet material. During a given cutting operation, the cutting implement and thus the presser foot may be vertically moved several times into and out of engagement with the sheet material. Each time the cutting implement subsequently reengages the sheet material, the presser foot bottom surface must again be reseated. This continual reseating of the presser foot bottom surface is undesirable because a new seal between the presser foot and the sheet material must again be created and, in instances, the effectiveness of each new seal may vary with respect to preceeding or subsequent seals.

Accordingly, it is the object of the present invention to provide a vacuum shroud assembly that is independently fixed to a support on a cutting machine and is capable of being vertically adjustable independently of vertical movement of a cutting apparatus.

It is another object of the present invention to provide a vacuum shroud assembly having a compressible medium formed between the support and the sheet material to provide a constant and even downwardly force on the underside of the presser foot to thereby maintain a seal therebetween.

A further object of the present invention is to provide a vacuum shroud having at least one duct for evacuating air from the shroud to carry away shredded material collected within the vacuum shroud.

Yet still another object of the present invention is to provide a vacuum shroud having an undersurface formed from a low friction material permitting the vacuum shroud to contact the sheet material and slide relative thereto.

SUMMARY OF THE INVENTION

The present invention resides in a work material holddown and chip removal means for a cutting machine having a planar support surface for supporting a work piece thereon and a carriage supported for movement above the planar support surface and further supporting a shroud body having a chamber formed therein and being connected with the carriage by a connecting flange which upwardly extends from the body and is adjustably fixed to the carriage by connecting means. The body has a top surface having an opening which receives a part of a cutting tool. A base portion is connected with the body and confronts resilient means interposed between the base portion bottom surface and a contact element formed from a low friction material which has a sliding surface contacting the work piece. Fixing means connect the contact element and the resilient layer with the base portion such that contact between the sliding surface and the work piece is maintained by a force exerted downwardly on the contact element by the resilient means when the resilient means is compressed and is maintained in a compressed state by the connecting means.

DETAILED DESCRIPTION OF THE PREFERRED EMBODIMENT

Figure 1:
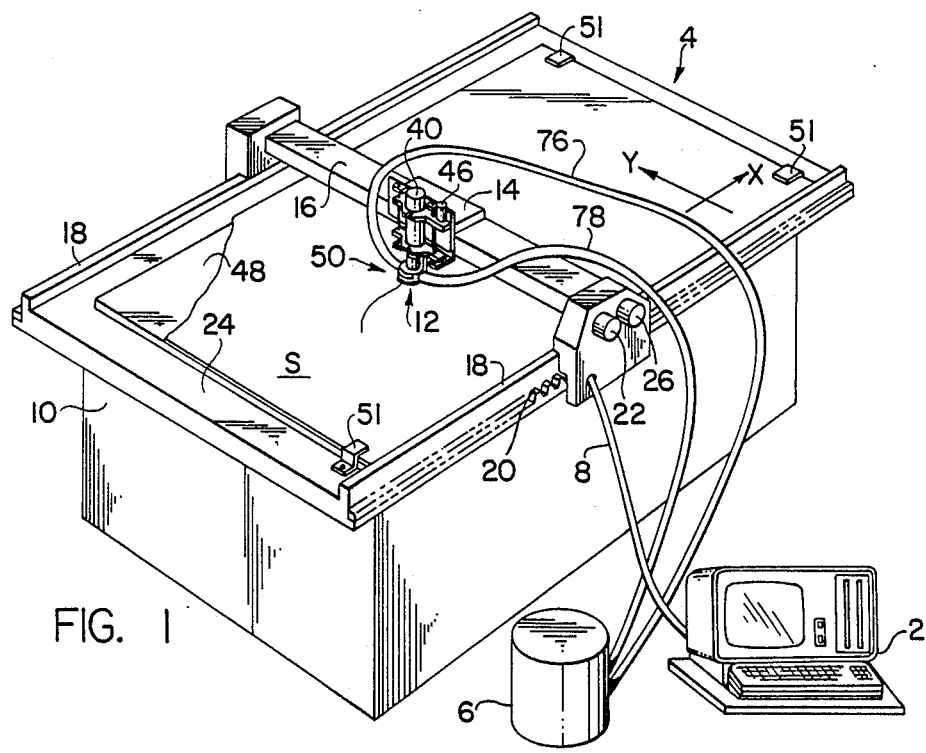
FIG. 1 is a perspective view showing one embodiment of the cutting machine employing the vacuum shroud of the present invention.

As illustrated in the figures, and first referring to FIG. 1, the cutting system according to the preferred embodiment of the invention includes a controller 2 having a computer, an automatically controlled cutting machine 4 and a vacuum pump 6. The controller 2 is interconnected with the automatically controlled cutting machine 4 by suitable interconnecting means such as cable 8. The controller 2 reads a cutting program from an input source such as a disc or tape and translates the programmed information into command signals which control the operation of the cutting machine 4 to cause patterns of selected shapes to be cut from sheet materials such as cardboard, plastic or similar work pieces. Alternatively, the controller 2 may be used as an input device for the cutting machine so that cutting programs can be produced "on line" or simultaneously with the cutting operation.

The cutting machine 4 includes a cutting table 10 having a bed 24 for supporting the sheet material S in a flat condition and a cutting tool 12 which is translated over the bed in a cutting relationship with the material S. A pair of tool supporting carriages 16 and 14 are mounted above the bed 24 for translating the tool 12 back and forth over the support surface defined by the bed 24 in the illustrated X and Y coordinate directions. The X carriage 16 is supported at the lateral sides of the table 10 on a pair of rails or ways 18 extending parallel to the X coordinate direction. Gear tracks 20 or other suitable drive linkages are fixed adjacent the ways 18 and are engaged by pinions (not shown) which are fixed to the downwardly depending structure of the X carriage 16. Each of the pinions are operated by an X drive motor 22 in response to command signals generated by the controller 2 and transmitted to the table 10 through the cabling 8. The Y carriage 14 is supported on the X carriage 16 and is movable relative to the X carriage 16 and the table bed 24 in the illustrated Y direction. A lead screw (not shown) or other suitable drive linkage engages the Y carriage 14 and is rotatably driven by a Y drive motor 26 in response to commands received by the controller 2. Composite motions of the X and Y carriages translate the cutting tool 12 over the surface of the bed 24 and advance the tool along a desired or programmed cutting path to cut a pattern from the sheet material S.

Figure 2:
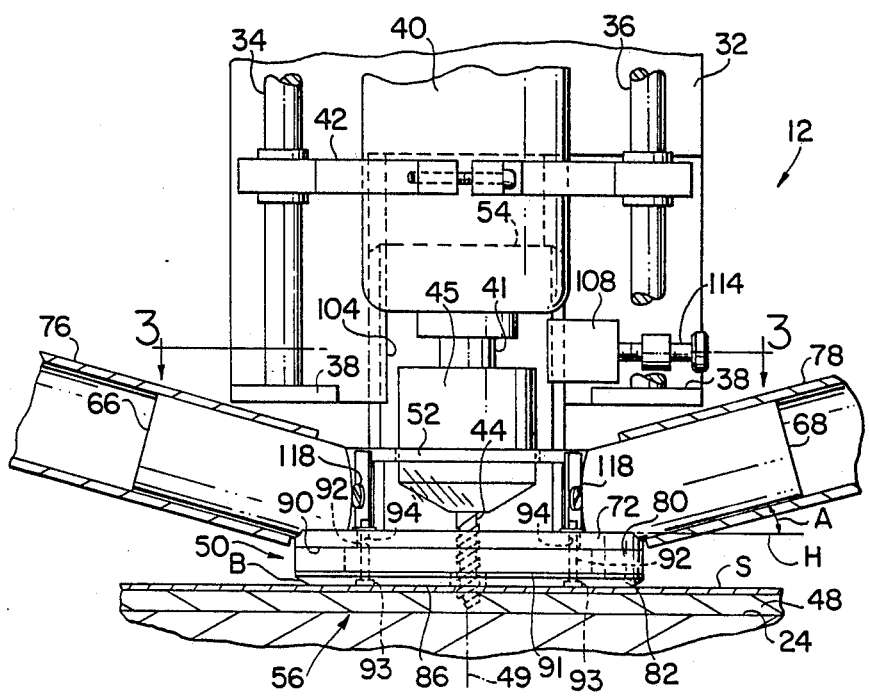
FIG. 2 is a front elevation view showing the cutting tool partly in section as it is employed in the cutting machine shown in FIG. 1.

Referring now to FIG. 2, the Y carriage 14, supports a tool mounting plate 32 which is fixedly secured to the Y carriage 14 by bolts and dowel pins (not shown). A pair of slide rods 34 and 36 are secured in a spaced relationship relative to the mounting plate 32 by upper (not shown) and lower extending flanges 38 laterally depending from the mounting plate 32. A drive motor 40 having a drive shaft 41 is in turn supported by each of the slide rods 34 and 36 through upper and lower clamping brackets 42 which are clamped to the motor 40 and slide up and down the rods 34 and 36 thus enabling movement of the motor 40 in a vertical direction. A holder 45 is nonrotatably fixed to one end of the drive shaft 41 of the drive motor 40 and, in turn, nonrotatably fixes a cutting implement 44 with the drive shaft 41 such that the motor 40 rotates the shaft 41, the holder 45 and the implement 44 about a common axis of rotation 49.

A vertical positioning motor 46 is also fixed to the mounting plate 32 to control the upward and downward movements of the motor 40. The positioning motor 46 drives a lead screw (not shown) which is oriented parallel with axis 49 and is supported on the mounting plate 32. The lead screw engages a threaded opening formed in a laterally extending portion of the upper bracket 42 fixed to the upper portion of the motor 40. Thus, the rotation of the motor 46 in either a clockwise or a counterclockwise direction subsequently controls the upward and the downward movement of the holder 45 and, in turn, the penetration depth of the cutting implement 44 into the sheet material S.

The vertical positioning motor 46 is also controlled by commands from the controller 2 which are inputted by the operator at the beginning of the cutting operation. The penetration depth of the cutting implement 44 is determined by the thickness of the sheet material S being cut and by the thickness of a sacrificial base 48 underlying the sheet material S. The sacrificial base protects the end of the tool implement 44 from contacting the upper surface of the bed 24. Materials such as scrap plastic sheets, wood or STYROFOAM can be used as the sacrificial base 48. Both the sheet material S and the sacrificial material 48 are held down on the bed 24 using variable position clamps 51 having bolts which attach each clamp to the bed 24. Thus, the sheet material and sacrificial material are held rigidly and unitarily on the upper surface of the bed 24.

As previously discussed, the cutting implement 44 rotates about the axis of rotation 49. The cutting implement has a plurality of helical cutting edges coaxially arranged about the axis of rotation 49. During the cutting operation, the cutting implement 44 is rotated and is lowered into engagement with the sheet material S and the sacrificial base 48. The cutting implement is rotated in such a direction which pulls the sheet material S upwardly. Furthermore, as the cutting implement moves along a selected path, shreds of cut sheet material are drawn upwardly by the rotation of the cutting implement 44 and remain about the path if not removed. Thus, in accordance with the invention, a vacuum shroud 50 is adjustably attached to the mounting plate 32 and serves to both independently hold down the sheet material S while removing shreds and chips of cut material.

Figure 3:
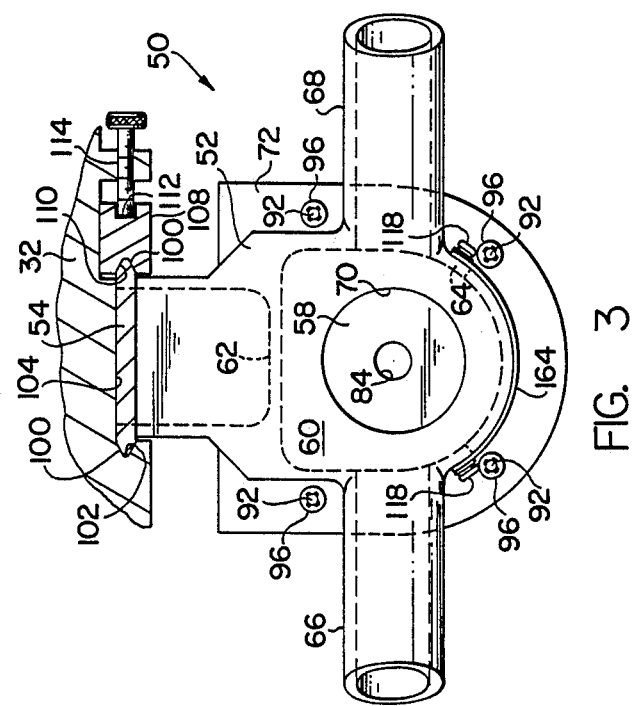
FIG. 3 shows a top view taken along section 3—3 in FIG. 2 showing the vacuum shroud connected with the mounting plate.

As shown in FIG. 3, the vacuum shroud 50 is generally comprised of a body portion 52, a connecting flange 54 and a presser foot 56. The shroud 50 is preferably cast from an aluminum alloy. The shroud body portion 52 partially defines a chamber 58 which is enclosed by a rear upstanding body wall portion 62 and a front upstanding body wall portion 64. A body top surface 60 partially encloses the chamber 58 and has an opening 70 defined by an annular lateral edge of the top surface 60. Intermediate the body upstanding wall portions 62 and 64 are two diametrically opposed duct portions 66 and 68 which are formed integrally with each end of the upstanding wall portions 62 and 64 and the top surface 60. The duct portions 66 and 68 are tubes which extend laterally from opposite sides of the body portion 52 to communicate a vacuum source with the chamber 58. The duct portions 66 and 68, as is shown in FIG. 2, extend upwardly at an angle A of approximately 20 degrees to a horizontal plane H defined by the upper extent of the presser foot 56. Hoses 76 and 78 respectively attach to each of the duct portions 66 and 68. The inclination of the duct portions 66 and 68 allows the hoses 76 and 78 to be oriented upwardly and away from the cutting tool 12 thus preventing the cutting tool 12 from becoming entangled with the hoses.

The shroud body portion 52 includes a laterally extending base portion 72 outwardly depending from the lower extent of the shroud body portion 52. The base portion 72, as shown in FIG. 3, surrounds substantially the entire lower extent of the body portion 52. The base portion 72 is preferably formed as a flange integrally with the body portion 52 and each of the duct portions 66 and 68. As such, the flange or base portion 72 is highly rigid and possesses sufficient strength to support the presser foot 56.

The presser foot 56 includes a resilient layer of material 80 preferably formed, for example, from a closed cell foam rubber neoprene material. The resilient layer 80 is therefore compressible when adequate downward pressure is applied to the body portion 52, yet is sufficiently elastic to return to its normal thickness when the pressure is curtailed. The thickness of layer 80 is preferably selected to be approximately one quarter of an inch. Also, the closed-cell structure of the foam rubber is air impermeable and thus maintains an airtight barrier between the laterally outer perimeter of the resilient layer 80 and the inner chamber 58. The upper surface of the resilient layer 80 confronts bottom surface 90 on the base portion 72. It should be noted that the laterally outer perimeter of the layer 80 is coincident with the laterally outer perimeter of the base portion 72 and the layer 80 has an inner lateral perimeter generally coincident with the point where the base portion 72 and the body portion 52 meet. Thus, the layer 80 has an inner confine 95 (FIG. 4) which is free of material and which further defines a portion of chamber 58 therein. Accordingly, downward pressure applied to the shroud body portion 52, acts only along an outer perimeter defined by the resilient layer 80 underlying base portion lower surface 90.

Figure 4:
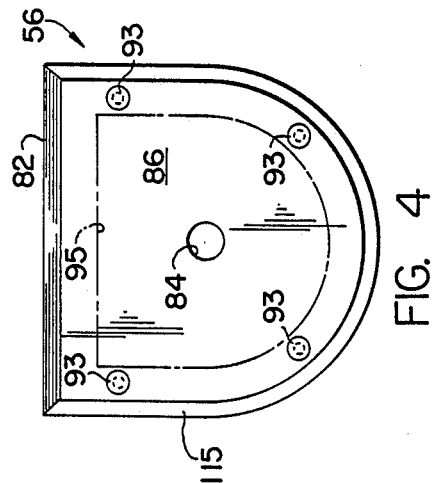
FIG. 4 is a view of the contact element inverted to show the bottom sliding surface and further shows, in phantom line, the resilient layer employed in the vacuum shroud of the present invention.

As shown in FIGS. 2 and 4, a contact element 82 confronts lower surface 91 of the resilient layer 80. The contact element 82 is formed from a low friction material such as DELRIN or the like. The contact element 82 has a sliding surface 86 which is adapted to contact and slide on the sheet material S. Since the surface 86 is formed from a material having a low coefficient of friction, relative movement between the sliding surface 86 and the contacted sheet material S occurs without significant frictional resistance. The contact element 82 and the resilient layer 80 are connected to the laterally extending base portion 72 by pins 92 having heads 93 integrally molded within the contact element 82. The contact element 82 has a thickness of approximately ⅛" which allows each head 93 to be sufficiently embedded within the material.

Coaxially aligned apertures 94 are selectively formed in each of the base portion 72 and the resilient layer 80 underlying the base portion 72 to receive the pins 92. Lock washers 96 prevent the pins 92 from being pulled through the apertures 94 when the body portion 52 is raised. The lock washers 96 are preferably connected with the pins 92 during assembly to slightly compress the resilient layer 80 to thus prevent possible relative movement between the presser foot elements. An opening or bore 84 is formed coaxially with the axis 49 through the contact element 82. The opening 84 permits the cutting implement 44 to pass through the contact element 82 and is sized such as to allow shreds and other debris cut from the sheet material S and the sacrificial base 48 to pass upwardly through the opening 84 and into the chamber 58.

Turning now to FIGS. 2 and 3, the connecting flange 54 includes two peak shaped gibs 100 laterally extending from each opposite side of the connecting flange 54. A U-shaped cutout 104 is formed in the support plate 32 to receive the flange 54. Along one inner side face of the cutout 104 is formed a groove 102. Opposite the groove 102, adjacent the opposite inner side face of the cutout 104, is a groove segment 108 which is laterally slidable relative to the support plate 32. A groove 110, identical in cross-sectional configuration with groove 102, is formed longitudinally along the surface of the segment 108 communicating within the cutout 104. The cross-sectional configuration of each of the grooves 102 and 110 are correspondingly shaped and closely sized to receive each peak-shaped section of the gibs 100 in an interference fit therewith. On the side of the segment 108, opposite the groove 110, is a blind opening or bore 112 formed within the segment 108. The opening 112 receives the blunt, unthreaded end of a take-up bolt 114. The take-up bolt 114 is threadably connected in the mounting plate 32. In operation, tightening of the takeup bolt 114 will advance the groove segment 108 toward the connecting flange 54. Continued turning of the bolt 114 will compress the gibs 100 within the grooves 102 and 110. The peak-shaped configuration of each of the gibs 100 and the correspondingly shaped grooves 102 and 110 creates a biting or interference action between the interengaging parts which in turn fixes the connecting flange 54 from relative movement with the mounting plate 32. Thus, the position of the vacuum shroud 50 is adjustable relative to the mounting plate 32 and such adjustment is independent of the upward and downward movements of the cutting machine 12.

It is a feature of the invention to allow the sliding surface 86 to move readily along the sheet material S. The leading edge of the contact element 82 has a chamfer 115 having an angle B of approximately 30 degrees. As is shown in FIG. 4, the chamfer 115 extends around the total perimeter of the contact element 82. The chamfer 115 facilitates movement of the sliding surface 86 when the vacuum shroud 50 is moved in any direction along a path on the work sheet S by the carriages 14 and 16.

Another feature of the invention includes a window 164 which forms part of the front upstanding wall portion 64. The window 164 covers an opening in the front upstanding wall portion 64 and provides the operator with a means to observe the cutting operation as it is occurring. The window 164 is formed from a thin strip of clear plastic which overlays the opening in the front upstanding wall portion 64 and is secured to this portion by screws 118. However, where the window 164 is not desired, the front upstanding wall may alternatively be solid throughout its length to thus continuously enclose and define the chamber 58.

In use, each of the duct portions 66 and 68 are respectively connected to the hoses 76 and 78 which hoses in turn are connected with the vacuum pump 6. As has been previously discussed, the body portion 52 has an opening 70. The opening 70 is concentric with the opening 84 and the axis 49. Accordingly, the opening 70 receives the holder 45 and the opening 84 receives the cutting implement 44. While a small clearance between the holder 45 and the opening 70 does exist, the clearance does not substantially inhibit the creation of a strong vacuum within the chamber 58 when the vacuum pump 6 is activated and the holder 45 is lowered through the opening 70.

When the cutting machine 12 is cutting a pattern and is moved by the carriages 14 and 16 along a path on the sheet material S, the presser foot 56 of the vacuum shroud 50 maintains a strong and constant seal between the sliding surface 86 and the sheet material S. Initially, both the vacuum shroud 50 and the cutting tool 45 are upwardly raised to permit the placement of the sacrificial base 48 and the sheet material S onto the support bed 24. The holder 45 is elevated by the vertical positioning motor 46, as has been previously discussed, and the vacuum shroud 50 is manually elevated once the take-up bolt 114 is loosened. The seal between the presser foot 56 and the work surface S is subsequently created once the sheet material S is mounted onto the bed 24. In so doing, the user applies a 5 to 10 pound downward force onto the upper surface of the shroud 50 to thereby compress the resilient layer 80. While still maintaining the downward force, the user then tightens the take-up bolt 114 to lock the connecting flange 54 with the support plate 32. Thus, the resilient layer 80 remains compressed and exerts a reactant force between the lower surface 90 of the base portion 72 and the contact element 82 to thereby forcibly hold the sliding surface 86 down onto the sheet material S. It should be appreciated, that the seal between the sliding surface 86 and the sheet material S is maintained independently of any vertical movement otherwise occurring in the cutting tool 12. Also, the opening 70 is in turn effectively sealed once the holder 45 is lowered therein. As discussed, the height of the holder 45 relative to the bed 24 is variably controlled by the controller 2 through input entered into it by the user. Thus, despite possible variations in the height of the presser foot 56 above the bed 24 due to varying sheet material thicknesses, the holder 45 height may be adjusted by the controller 2 such that it substantially communicates into the opening 70 to generally seal the chamber 58.

While the present invention has been described in a preferred embodiment, it should be understood that numerous modifications and substitutions can be had without departing from the spirit of the invention. For example, it is not essential that two duct portions 66 and 68 be utilized to draw shreds away from the chamber 58 during a cutting operation. In the embodiment where the single duct portion is used, both front and rear walls would therefore be extended to meet with each other where the eliminated duct portion would have existed. Also, a positive pressure system possibly utilizing the drive motor 40 could be used to blow the shreds from the cutting implement 44 and the chamber 58 and out the ducts. In addition, it is not essential that the opening 84 be formed in the contact element 82 before the shroud 50 is assembled. The opening 84 could be formed by the cutting tool using a modified cutting implement once the shroud 50 is fixed to the mounting plate. Accordingly, the present invention has been described in a preferred embodiment by way of illustration rather than limitation.

I claim:

1. A vacuum shroud for use with a cutting machine having a rotary cutting tool said shroud comprising:
   a body portion partially defining a chamber for receiving at least part of a rotary cutting tool;
   said body portion having a top surface and a first opening providing communication between said top surface and said chamber;
   at least one duct portion extending generally laterally outwardly from said body portion and communicating with said chamber;
   a base portion connected with said body portion and having a lower surface;
   a resilient layer having an upper and a lower surface, said resilient layer upper surface underlying and facing said lower surface of said base portion;
   a contact element formed from a low friction material and having an upper surface and a lower sliding surface, said contact element upper surface underlies and faces said resilient layer lower surface and defining said portion of said chamber;
   attachment means connecting said contact element and said resilient layer to said base portion;
   a second opening formed in said contact element to provide communication between said lower surface of said contact element and said chamber, said first and said second openings being concentric with one another, and said resilient layer having means providing communication between said second opening and said chamber; and
   a connecting flange extending upwardly from said body portion and having connecting means formed thereon for attaching said vacuum shroud to a support.

2. A vacuum shroud as defined in claim 1 wherein said means providing communication between said second opening and said chamber includes said resilient layer having an inner confine further defining said chamber and said resilient layer is formed from closed-cell foam rubber; and wherein said attachment means include pins fixed integrally with said contact element and extending upwardly therefrom toward said base.

3. A vacuum shroud as defined in claim 2 wherein:
   said pins communicate through openings formed coextensively in each of said resilient layer and said base portion and have free ends, said free ends of said pins are prevented from being retracted through said coextensive openings by retaining washers fixed to each of the free ends of said pins.

4. A vacuum shroud as defined in claim 1 wherein said body portion defining said chamber includes a front upstanding wall portion and a rear upstanding wall portion and first and second duct portions outwardly extending from said body and being diametrically opposed to one another such that each duct portion circumferentially spaces said front upstanding wall portion from said rear upstanding wall portion.

5. A vacuum shroud as defined in claim 4 wherein:
   said front upstanding wall portion includes a window having a strip of transparent material fixed to said body portion; and
   said chamber further being defined by said top surface connecting each of said first and second duct portions and each of said front and rear upstanding wall portions with one another.

6. A vacuum shroud as defined in claim 2 wherein:
   said contact element upper surface extends laterally outwardly to a farther extent than said contact element lower sliding surface to thereby create a chamfer edge around said contact element.

7. A vacuum shroud as defined in claim 4 wherein:
   said body portion, said base portion, said first and second duct portions and said connecting flange are cast from an aluminum alloy; and wherein said contact element is formed from DELRIN.

8. A vacuum shroud as defined in claim 1 wherein:
   said connecting means formed on said connecting flange include two longitudinally oriented gibs each extending outwardly from opposite sides of said flange;
   each of said gibs having in cross-section a peak shape; and wherein said resilient layer is formed from closed-cell foam rubber neoprene.

9. A vacuum shroud as defined in claim 4 wherein:
   said first and said second duct portions are oriented at an inclination relative to said base portion.

10. In a cutting machine, the combination comprising:
    a planar support bed for supporting a work piece thereon;

a carriage supported for movement above said planar support bed and carrying a vertically movable cutting tool;

a body partially defining a chamber, said body having a top surface having a first opening providing communication between said top surface and said chamber for receiving a part of said cutting tool therein;

a connecting flange upwardly extending from said body;

at least one duct outwardly extending from said body and communicating with said chamber;

means connected with said at least one duct for evacuating said chamber;

a base portion connected with said body and having a lower surface;

a contact element formed from a low friction material and having a lower sliding surface for contacting said work piece and having an upper surface, said contact element having a second opening coaligned with said first opening;

resilient means interposed between said base portion lower surface and said contact element upper surface providing a compressible medium therebetween and having means providing communication between said second opening and said chamber;

fixing means for connecting said resilient means and said contact element to said base;

connecting means for adjustably securing said connecting flange to said carriage; and wherein contact between said contact element sliding surface and said work piece is maintained by a downward force exerted on said contact element by said resilient means when said resilient means is maintained in a compressed state by said connecting means to thereby create a continually formed seal between said contact element lower surface and said work piece which is formed independently of the vertical movements of the cutting tool.

11. The combination as defined in claim 10 wherein said resilient means is a layer of closed cell foam rubber and said means providing communication is a resilient layer inner confine further defining said chamber; and, said fixing means include pins integrally attached with said contact element at one end and having free ends oriented upwardly from the contact element.

12. The combination as defined in claim 11 wherein:
said fixing means further includes
coaligned openings formed in each of said base portion and said resilient layer to receive said pins extending upwardly from said contact element; and
lock washers being attached to the free ends of said pins to prevent withdrawal of said pins from said openings.

13. The combination as defined in claim 10 wherein:
said connecting means includes two longitudinally oriented gibs formed on opposite sides of said connecting flange;
each of said gibs having in cross-section a peak shape;
said carriage including a mounting plate having a cutout for receiving said connecting flange therein;
said cutout having recesses oriented on opposing side faces and being shaped to receive each of said gibs therein; and
one of said recesses oriented within said cutout being laterally displaceable relative to said mounting plate for compressing said gibs within each of said recesses to thus prevent said connecting flange from moving relative to said carriage.

14. The combination as defined in claim 12 wherein said chamber is defined by said body having a front upstanding wall portion and a rear upstanding wall portion; said body further including first and second duct portions diametrically opposed to one another and interconnecting said front and rear upstanding wall portions; and
wherein said first and second duct portions and said front and rear upstanding wall portions are interconnected by said top surface.

15. The combination as defined in claim 14 wherein:
said front and rear upstanding wall portions, said first and second duct portions, said top surface, said base portion, and said connecting flange are unitarily cast from an aluminum alloy.

16. The combination as defined in claim 15 wherein:
said front upstanding wall portion includes a window having a transparent material fixed to said body.

17. The combination as defined in claim 11 wherein:
the outer lateral periphery of said contact element is chamfered and said pins are molded in said contact element.

18. The combination as defined in claim 16 wherein:
said first and said second duct portions are oriented at an inclination relative to said base portion.

19. The combination as defined in claim 10 wherein:
said first opening in said body portion is larger in diameter than said second opening in said contact element; and
wherein said first and second openings are concentrically arranged about a common axis, which axis also defines the line of vertical movement of said cutting tool.

* * * * *